(12) United States Patent
Srinivasan et al.

(10) Patent No.: US 10,362,046 B1
(45) Date of Patent: Jul. 23, 2019

(54) RUNTIME BEHAVIOR OF COMPUTING RESOURCES OF A DISTRIBUTED ENVIRONMENT

(71) Applicant: Amazon Technologies, Inc., Seattle, WA (US)

(72) Inventors: Preethi Srinivasan, Herndon, VA (US); Aparna Nagargadde, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 295 days.

(21) Appl. No.: 15/473,511

(22) Filed: Mar. 29, 2017

(51) Int. Cl.
*G06F 12/14* (2006.01)
*H04L 29/06* (2006.01)

(52) U.S. Cl.
CPC ...... *H04L 63/1425* (2013.01); *H04L 63/1441* (2013.01); *H04L 63/20* (2013.01)

(58) Field of Classification Search
USPC ...................................................... 726/23, 25
See application file for complete search history.

(56) References Cited

U.S. PATENT DOCUMENTS

| | | | | |
|---|---|---|---|---|
| 7,463,590 B2 * | 12/2008 | Mualem | ............... | H04L 63/1458 370/241 |
| 8,413,249 B1 * | 4/2013 | Chou | ................... | G06F 11/00 726/25 |
| 8,990,948 B2 * | 3/2015 | Kumar | ................. | G06F 21/52 345/440 |
| 9,979,753 B2 * | 5/2018 | Chesla | .................... | H04L 63/02 |
| 10,057,285 B2 * | 8/2018 | Choudhary | ............ | G06F 21/552 |
| 2013/0347111 A1 * | 12/2013 | Karta | .................. | H04L 63/1441 726/23 |
| 2016/0277423 A1 * | 9/2016 | Apostolescu | ......... | H04L 63/145 |
| 2017/0178026 A1 * | 6/2017 | Thomas | ................ | G06F 21/552 |
| 2018/0075233 A1 * | 3/2018 | Gray | ........................ | G06F 21/54 |
| 2019/0012672 A1 * | 1/2019 | Francesco | .............. | G06Q 20/34 |

OTHER PUBLICATIONS

"Oval Language," OVAL, Apr. 22, 2015, <https://oval.mitre.org/language/> [retrieved Mar. 29, 2017], 1 page.

* cited by examiner

*Primary Examiner* — Amare F Tabor
(74) *Attorney, Agent, or Firm* — Davis Wright Tremaine LLP

(57) ABSTRACT

Customers of a computing resource service provider may operate one or more computing resource provided by the computing resource service provider. In addition, the customers may execute agent using the one or more computing resources provided by the computing resource service provider. Operational information from customer-operated computing resources may be obtained by the agents and evaluated for security threats. The operational information may be evaluated based at least in part on a set of security rules. The security rules may be generated at least in part on customer input to generate customer defined security rules.

20 Claims, 8 Drawing Sheets

RUNTIME BEHAVIOR OF COMPUTING RESOURCES OF A DISTRIBUTED ENVIRONMENT

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate the utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

In a large distributed computing system (e.g., multiple distributed data centers) of a computing resource service provider, various customers, users, services, and resources of the computing resource service provider are in frequent communication with each other. Keeping the system secure becomes more challenging as applications are updated and as the complexity and usage of the system increases. In such distributed computing systems, it can be difficult to identify the vulnerabilities of the system. Furthermore, it can also be difficult to isolate and troubleshoot issues with the system, and even when issues are identified, reliably securing the system may be challenging. Additionally, many conventional systems rely upon manual mitigation of such vulnerabilities. The complexity and distribution of computing resources in these environments may make it difficult to collect and analyze log information generated by the computing resources.

BRIEF DESCRIPTION OF THE DRAWINGS

Various techniques will be described with reference to the drawings, in which.

DETAILED DESCRIPTION

Figure 1:
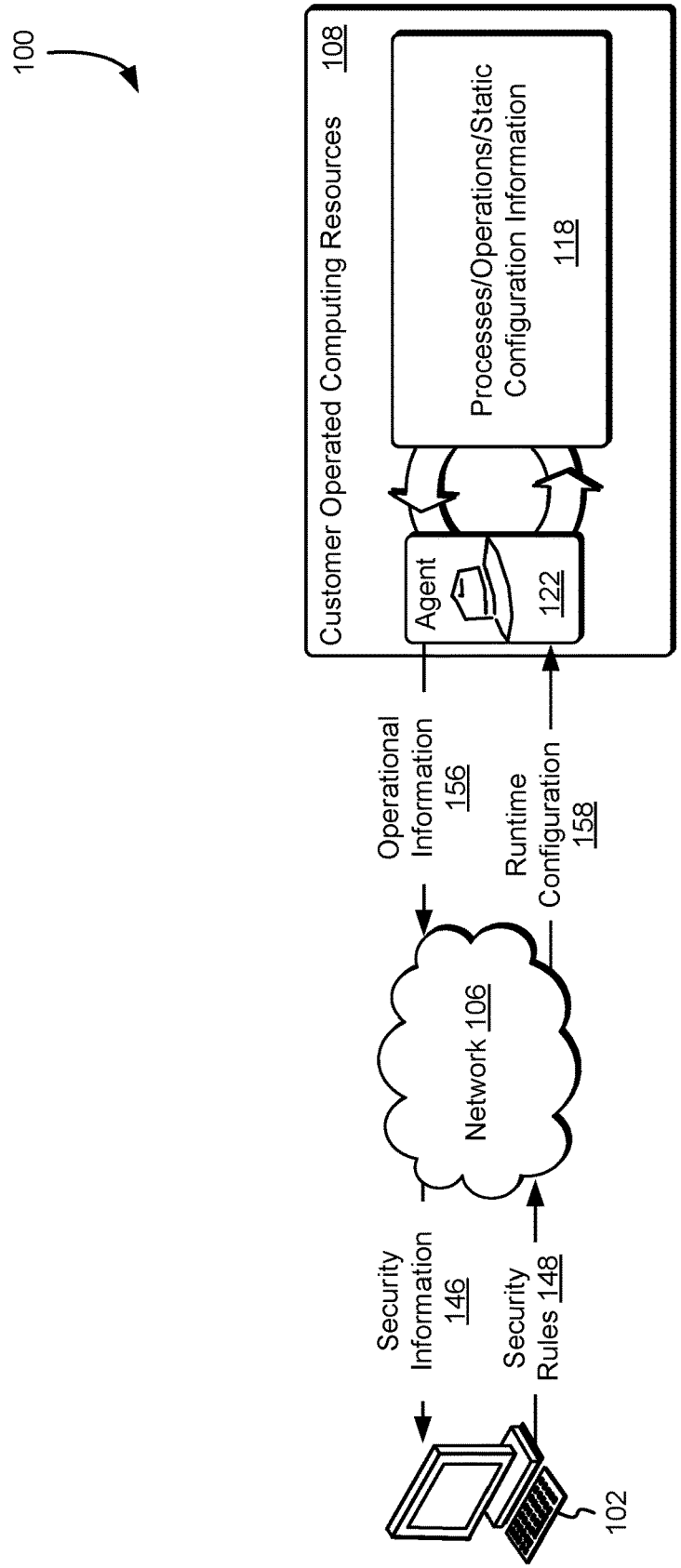
FIG. 1 illustrates an environment in which an agent monitors runtime processes and/or operations of customer-operated computing resources in accordance with at least one embodiment.

In various examples described below, an agent, executed by customer-operated computing resources, monitors processes and/or operations of the customer-operated computing resources to detect and/or mitigate security threats. In addition, the agent also collects and/or obtains operational information from the customer-operated computing resources and provides the operational information to a security service of a computing resource service provider. The operational information includes information about processes, applications, or other software executing on customer-operated computing resources as well as operations performed by the customer-operated computing resources (e.g., operations performed by the customer-operated computing resource as a result of executing the processes, applications, or other software). The customer-operated computing resources are provided by the computing resource service provider. The computing resource service provider may provide computing resources such as virtual machines, remote data storage, networking resources, and a variety of other computing resources to customers. Customers may remotely and programmatically manage these computing resources to cause the resources to implement various applications. For example, a customer using a virtual machine can implement a webserver to establish network connections with other customers and entities over a network, such as the Internet.

In several embodiments described in the present disclosure, the operational information collected from customer-operated computing resources (e.g., through agent applications executed by the customer-operated computing resources) is analyzed at one or more central locations, such as the security service. As described in greater detail below the security service generates security information or other findings based at least in part on the operational information. The security information may indicate vulnerabilities in the customer-operated computing resource, remedial operations performed by the agent, or other information regarding the security of the customer-operated computing resources. The security service also provides the customer with a mechanism for generating and/or providing specific rule sets for particular customer-operated computing resources. In various embodiments described in greater detail below, these rule sets cause the agent to monitor particular operations of the customer-operated computing resources, collect particular information from the customer-operated computing resources, determine particular security threats to the customer-operated computing resources, perform particular remedial operations in response to security threats, and/or other customer defined security operations. Furthermore, the remedial operations may be performed without a contemporaneous request or command from the customer. For example, the remedial operation is performed automatically upon a triggering event such as detecting a violation of a particular security rule.

In one example, a customer defines a rule set that indicates that none of the applications executed by the customer-operated computing resources may access a restricted storage location accessible to the customer-operated computing resources. In one embodiment, the rule set is defined using a formalized programming language such as Open Vulnerability and Assessment Language (OVAL). The security service obtains the customer defined rule set and provides the rule set to one or more agents executed by the customer-operated computing resources. In addition, the security service may, in some embodiments, perform a validity check on the customer defined rule sets. Returning to the example above, if the agent detects violation of a particular rule (e.g., a particular application executed by the customer-operated computing resources is accessing the restricted storage location), the agent may perform a variety of remedial operations. For example, the agent my obtain operational information associated with the particular applications access, such as process information, core dump information, data accessed, network information, or any other information associated with the operation of the customer-operated computing resources. Yet other remedial operations include executing a script or other executable code, terminating a process, terminating a network connection, disabling the customer-operated computing resources, restarting the customer-operated computing resources, or any other operation indicated by the customer.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which an agent 122 monitors runtime processes, operations, and/or static configuration information 118 of customer-operated computing resource 108 in accordance with at least one embodiment. A customer 102 connected to a network 106, such as the Internet or other public network, may receive information associated with security information 146 collected by the agent 122 and/or security service described in greater detail below. The security information 146 may be determined based at least in part on operational information obtained from customer-operated computing resources 108. As described in greater detail below, a security service obtains operational information 156 from the agent 122 and generates security information 146 based at least in part on the operational information 156. In an embodiment, a customer of a computing resource service provider may utilize computing resources of the computing resource service provider to implement a virtual machine and load the agent 122 into memory of the virtual machine to detect and mitigate malicious activity or other activity which may be deemed a security threat or otherwise unwanted by the customer 102.

Attackers may attempt to compromise the customer-operated computing resource 108 in various ways over the network 106. In these embodiments, the agent 122 collects information corresponding to network connections and/or network connection attempts as well as allowing, denying, or terminating network connections based at least in part on a security rules 148 provided by the customer 102. The security rules 148 may be validated by the security service as described in greater detail below. In some embodiments, the security rules 148, once validated, are used by the security service to generate runtime configuration information 158 for the agent 122. The runtime configuration information 158 may include any information that controls the operation of the agent 122. For example, runtime configuration information 158 may indicate operational information 156 to be collected by the agent 122, security threats to the customer operation computing resources 108, and remedial/mitigating operations to be performed by the agent 122 based at least in part on detecting a trigger (e.g., a particular security threat associated with performing a particular remedial operation). In addition, the security rules 148 may be defined in a formal language such as OVAL or other programming language. In yet other embodiments, the customer 102 is guided (e.g., through a user interface), through a process of generating the security rules 148 based at least in part on the customer 102 response to one or more prompts and/or questions.

In the example illustrated in FIG. 1, the agent 122 executed by the customer-operated computing resources 108 and monitors operational information 156 of the customer-operated computing resources 108 based at least in part on the security rules 148 and runtime configuration 158 generated based at least in part on the security rules 148. The agent 122 may be a discrete entity separate from the customer-operated computing resources 108 or may be a process or application executed by the customer-operated computing resources 108. In one example, the agent 122 is an application executed by a virtual machine, where the virtual machine is a particular customer-operated computing resource. In another example, the agent 122 is a component of a hypervisor supporting the customer-operated computing resources 108. Finally, in yet another example, the agent 122 is a hardware component connected to a host computer system supporting the execution of the customer-operated computing resources 108. In addition, the operational information 156 monitored by the agent 122 is collected and used to generate security information 146. This information in the security information 146 is then presented to the customer 102 in such a manner that operations performed by the agent 122 and vulnerabilities of the customer-operated computing resources 108 as presented to the customer 102 as described in greater detail below. The agent 122 is used for illustrative purposes only and information in the security information 146 may be collected from any number of computing resources as described in the present disclosure. For example, network traffic information associated with the customer-operated computing resources 108 is obtained from a router or other network device connected to the customer-operated computing resources 108 and used in generation of the security information 146.

Returning to FIG. 1, the information on security information 146 may include process information, application information, source information, destination information, port information, ownership information, network protocol, memory information, storage information, compliance information, connection attempts, firewall information, malware information, anti-virus information, or any other information associated with security information suitable for presenting to the customer 102. In various embodiments, the agent 122 is executed with privileges within the customer-operated computing resources 108 sufficient to create, modify, terminate, or delete processes, applications, or information maintained or executed by the customer-operated computing resources 108. In one example, the agent 122 is a root process of the customer-operated computing resources 108. In another example, the agent 122 is provided with root access only when needed, as indicated in the security rules 148. Put in other words, if the security rules 148 indicate that a process is to be terminated in response to a particular operation (e.g., attempting to connect to a public network address), the agent 122 may be provided with root access only for the termination operation.

The operations of the agent 122 may be recorded in a log, event stream, or data structure and used by the security service to generate security information 146. The log or event stream may include a variety of events and other information. For example, the log may indicate a process ID, process name, files accessed or modified, an Internet Protocol (IP) address, a port number, protocol, application, owner identifier, and other information associated with operational information 156 obtained by the agent 122. The operational information 156 for the customer-operated computing resources 108 may be collected and provided to the security service. The security service, for example, periodically or aperiodically generates a set of findings to be provided to the customer 102; the set of findings are generated based at least in part on the operational information 156 obtained from the agent 122 and indicate vulnerabilities of the customer-operated computing resources 108 and mitigation operation performed by the agent 122.

In various embodiments, the customer 102 has one or more administrators that receive alerts associated with security information 146. The one or more administrators may be responsible for monitoring the security information 146 and preventing security threats to the customer-operated computing resources 108. The agent 122 may be set to continuously monitor the customer-operated computing resources 108 or may be set to periodically or aperiodically monitor the customer-operated computing resources 108 for an interval of time. When the agent 122 determines to perform a mitigation operation in response to a security threat detected based at least in part on the security rules 148 a message or other alert may be transmitted to the customer 102 or designated administrator indicating security information 146 and/or the mitigation operation performed by the agent 122 and/or result thereof. The notification may be an e-mail, Short Message Service (SMS), pop-up, or other suitable message.

As described in greater detail below, the security service may generate visualizations, alerts, and other information corresponding to the security information 146 and/or threat information, described in greater detail below, on behalf of the customer 102. For example, the security service provides the customer 102 with an indication of whether the customer-operated computing resources 108 are Payment Card Industry Data Security Standard (PCI DSS) compliant. In another example, the security service provides the customer 102 with an indication of whether particular users attempted to access restricted computing resources using the customer-operated computing resources 108. In these examples, the security rules 148 may indicate compliance requirements, notification requirements, as well as restricted operations, security threats, and mitigation operations.

For example, the security rules 148 may indicate that a connection to a public IP address over an unencrypted communication channel is a violation of the security rules 148 and indicate a specific script or other executable code to be executed in response to detecting a connection attempt to the public IP address over an unencrypted communication channel. The agent 122 monitoring the customer-operated computing resources 108 then detects the connection attempt and executes the script. In addition, the customer 102 may indicate in the security rules 148 a threat level or other designation of a security risk particular security rules. For example, the security rules 148 may indicate the particular customer-operated computing resources executing a previous version (e.g., out of date) application is a low security risk while the particular customer-operated computing resources using a deprecated authentication protocol is a high security risk. Furthermore, the customer 102 may define particular action to take in response to particular security risks or threat levels. For example, a low security risk issue, such as out of date software, is simply reported in the security information 146, while a high security risk, such as use of a deprecated authentication protocol, would cause the agent 122 to perform immediate remedial/mitigation operation. The remedial/mitigation operation may include termination of customer-operated computing resources, updates to applications, updates to the authentication protocol, or other operations to mitigate or eliminate the security threat.

The security rules 148 may be modified by the customer at any point in time and the modified security rules may be dynamically communicated to the agent 122 and update the operation of the agent. For example, the customer 102 may add a security rule indicating that a particular folder is restricted to access by users in a particular work groups. The new security rule is then provided to the agent 122 and the agent 122 then begins to monitor the particular folder for unauthorized access based at least in part on the new rule. As described above, if the new rule indicates a remedial operation to be performed in response to detecting a violation of the new rule, the agent 122 may perform the indicated remedial operation. In addition to the remedial operations described above, other operations may include updating firewall settings, updating access settings, updating policies, modifying access privileges, restarting or rebooting customer-operated computing resources 108, take a snapshot or otherwise record the current state of the customer-operated computing resources 108, contacting a service of the computing resource service provider, generating programmatic calls, such as Application Programming Interface (API) calls and web service calls, containing one or more external computing resources, or other operations.

Figure 2:
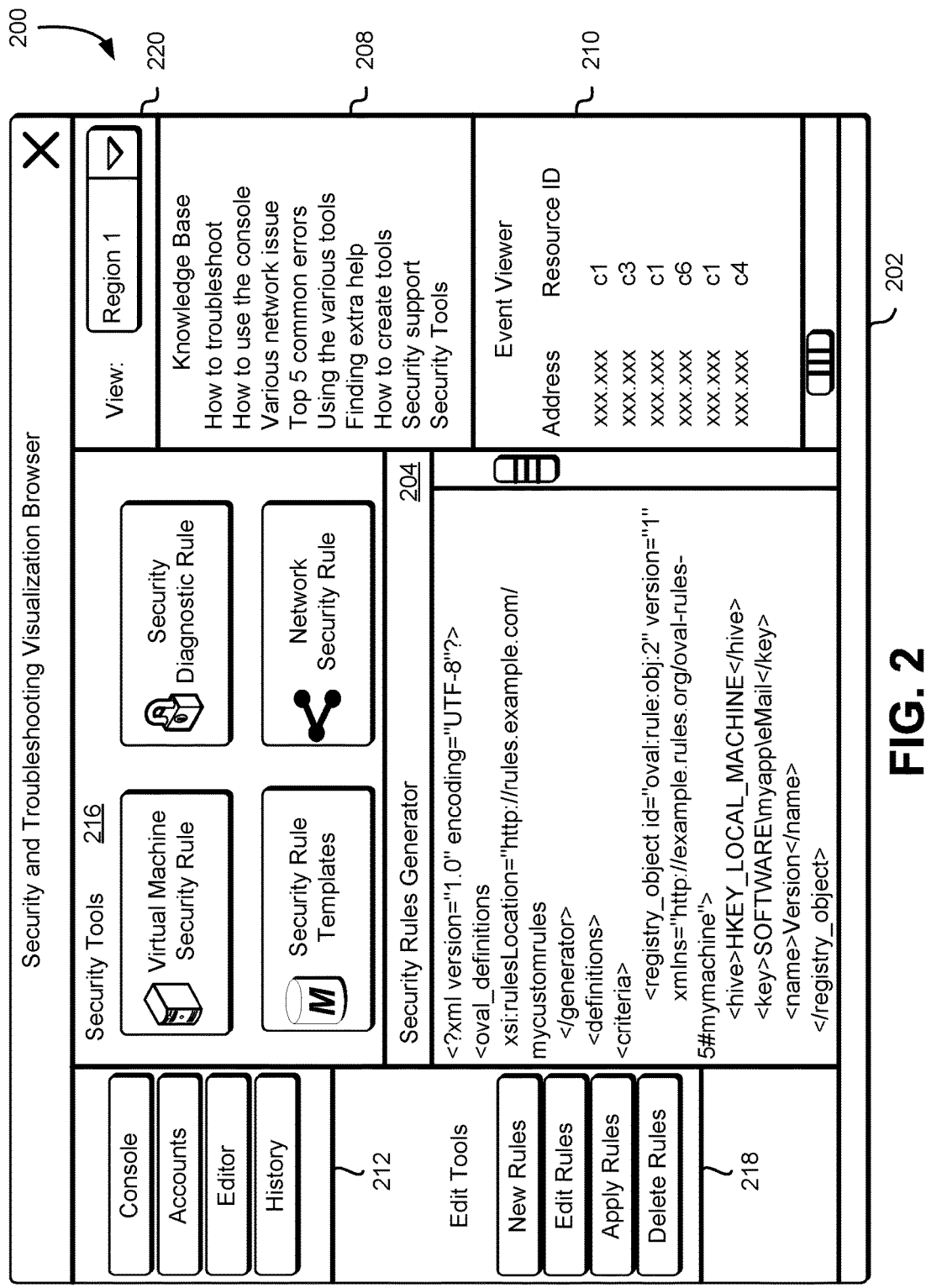
FIG. 2 is a diagram illustrating a management console exposed as a webpage in accordance with at least one embodiment.

FIG. 2 illustrates an example environment 200 where a remote security vulnerability and threat visualization browser 202 may be used to generate security rules used by an agent to monitor and/or mitigate security threats to customer-operated computing resources as described in the present disclosure at least described above in connection with FIG. 1 and in accordance with at least one embodiment. The remote security vulnerability and threat visualization browser 202 enables a customer to generate security rules, detect vulnerabilities, perform security operations, troubleshoot issues associated with computing resources operated by the customer, receive recommendations associated with the customer's architecture, search a knowledge base for information related to the computing resources operated by the customer, view customer security information, and generally diagnose and troubleshoot issues and/or vulnerabilities associated with the customer-operated computing resources. In various embodiments, the remote security vulnerability and threat visualization browser 202 is a computer system service such as a web service and provided as a service by the computing resource service provider as described in the present disclosure.

As illustrated in FIG. 2, the remote security vulnerability and threat visualization browser 202 is provided as a user interface executed by an application, such as a web browser executing on a computer system operated by the customer, as well as other user interfaces that may be used to present security information and/or security threat mitigation information to the customer and may, in some embodiments, be generated by the computing resource service provider and sent to the customer's display for rendering. In other embodiments, the customer's computing device may include functionality to generate some or all portions of the user interface. For example, the customer's web browser may include code for generating some of the graphics for rendering data received from the computing resource service provider. The service provider may receive the selection information from the customer's computing device and provide the requested information. The user interface may be generated or caused to be generated by a security service as described in the present disclosure.

The remote security vulnerability and threat visualization browser 202 may include security tools 216 that aid the customer in generating security rules and/or visualization of security information in the remote security vulnerability and threat visualization browser 202. For example, the security tools 216 may include a graphical user interface element, such as the buttons illustrated in FIG. 2, where selection of the graphical user interface element may cause the security service to execute a particular template of a security rule associated with the selected graphical customer element. For example, selection of the 'Security Rule Template' button causes display of a template security rule in a security rules generator 204 display pane of the remote security vulnerability and threat visualization browser 202. Based at least in part on the template, the customer may generate a security rule for the customer-operated computing resources.

In various embodiments, the remote security vulnerability and threat visualization browser 202 produces the graphical representation of security information based at least in part on a set of events detected by agents and indicated as security threats by the security rules. For example, the remote security vulnerability and threat visualization browser 202, in response to a request from a customer, transmits an API call or other command to the security service to obtain security information generated, based at least in part on, operational information obtained from a plurality of agents execute by the customer-operated computing resources. In various embodiments, the customer is prompted to provide additional information and/or configure additional resources as a result of receiving security information indicating a vulnerability associated with the customer-operated computing resources. For example, the customer is prompted to eliminate one or more vulnerabilities detected by the security service causing the customer-operated computing resources to not be in compliance with the PCI DSS standard. The graphical representation of security rules and/or security information may be displayed using tables, block diagrams, generated images, or visualization elements and may, in some embodiments, include one or more icons.

As illustrated in FIG. 2, the remote security vulnerability and threat visualization browser 202 further includes a set of options 212 used to perform various functions in connection with the remote security vulnerability and threat visualization browser 202. The set of options 212 may be a set of functions included in the remote security vulnerability and threat visualization browser 202 that enables a customer to perform a variety of operations such as managing accounts, creating security rules, and managing customer-operated computing resources. The options 212 may be configured as graphical user interface elements of the remote security vulnerability and threat visualization browser 202.

The account button may be configured to enable the customer to select particular customer accounts to perform security vulnerability and threat detection operations in connection with the selected customer accounts. In various embodiments, the customer operating the remote security vulnerability and threat visualization browser 202 is required to have, at the minimum, complete read permissions across all of the customer services and computing resources associated with the accounts the customer is attempting to perform security vulnerability and threat detection operations in connection with. The editor button may be configured to enable the customer to create or edit security rules and/or modify what operational information is available to the security service.

In various embodiments, the customer is provided with resources to aid in determining what events may be a greater security risk and require attention. Once operational information is obtained by the agents and provided to the security service, the customer may be provided with securing information or other indication of a threat level associated with a particular event detected by the agents. In addition, the security information may be saved in such a manner that they are accessible to all customer accounts and/or all other customers of the computing resource service provider. In this manner, events detected across various customer accounts may be detected and mitigated. The security information and/or security rules may also be submitted to the computing resource service provider for review and approval and after review, if the security information is found to be of good quality, it may be published to all customers and used as a support tool.

The remote security vulnerability and threat visualization browser 202 may further include an event viewer 210. The event viewer may be configured to provide information related to anomalous or other events detected in operational information based at least in part on the security rules. This information may provide a set of data, obtained by the agents, associated with systemic, operational, or maintenance events and the impact on customer computing resources along with schedules and remediation suggestions. The information displayed in the event viewer 210 may be generated automatically or in response to an agent detecting a violation of a particular security rule. The remote security vulnerability and threat visualization browser 202 may also include a knowledge base 208 which includes articles and provides access to curated content based at least in part on the information collected from customers of the computing resource service provider or generated by the computing resource service provider. The knowledge base may include suggestions on remedial actions for specific computing resource issues or suggest relevant security rules that could assess particular vulnerabilities or mitigate particular security threats. In addition, the security service may suggest or recommend particular knowledge-based articles based at least in part on operational information obtained by the agents.

Customers while working on a specific issue associated with an account or account group may use the remote security vulnerability and threat visualization browser 202 to provide the technical support service with additional information corresponding to the customer-operated computing resources. The customer may use editing tools 218 to edit, create, or modify existing security rules. For example, the customer may use the editing tools 218 to edit security rules associated with the customer-operated computing resources. In addition, the customer may be provided with the option to build a set of customer specific security rules from a set of curated rules maintained by the computing resource service provider or other entity. For example, the customer may select a set of security rules based at least in part on the Center for Internet Security (CIS) security configuration benchmark security rules. The customer may then modify or edit the set of security rules and/or add new security rules to the set of security rules.

Once a customer has established a connection to the security service through the remote security vulnerability and threat visualization browser 202, the remote security vulnerability and threat visualization browser 202 may automatically populate the customer's display with the information in various components of the remote security vulnerability and threat visualization browser 202, such as the event viewer and knowledge base. The customer may also be able to choose operational information to include based at least in part on a recommendations section or search for one using relevant keywords (not shown in FIG. 2 for simplicity). For example, some security information may provide an answer to issues directly (e.g., network attack issues) while other security information may render a trust score or other visualizations in the display plane (e.g., graphical representations of the network scan). As illustrated in FIG. 2, security information may return information such as an IP address of various computing resources, one or more open ports of various computing resources, and a trust score associated with the IP address of various computing resources. Other information may be displayed such as other unique identifiers of various computing resources, response times of various computing resources, and any other information obtained by the security service or other computer system correlating the operational information.

As an operation enabled by the remote security vulnerability and threat visualization browser 202, a customer can view different regions from a drop down menu 220. The different regions may include different geographical regions or different logical regions within the same or different geographical regions. For example, different regions may include two or more separate virtual networks. Customers may navigate to a particular group using a graphical user interface element as illustrated in FIG. 2. Selection of a particular region may limit the security information and generated views of information and operation information specific to the region. In various embodiments, the customer uses or creates security rules to monitor the customer-operated computing resources or regions associated with specific computing resources. The customer may use the remote security vulnerability and threat visualization browser 202 for automated execution of security rules (e.g., collection operational information and mitigation of security threats) in response to a periodic or aperiodic trigger. For example, the customer may select a particular set of computing resources to monitor for security threats based at least in part on a particular set of security rules.

Figure 3:
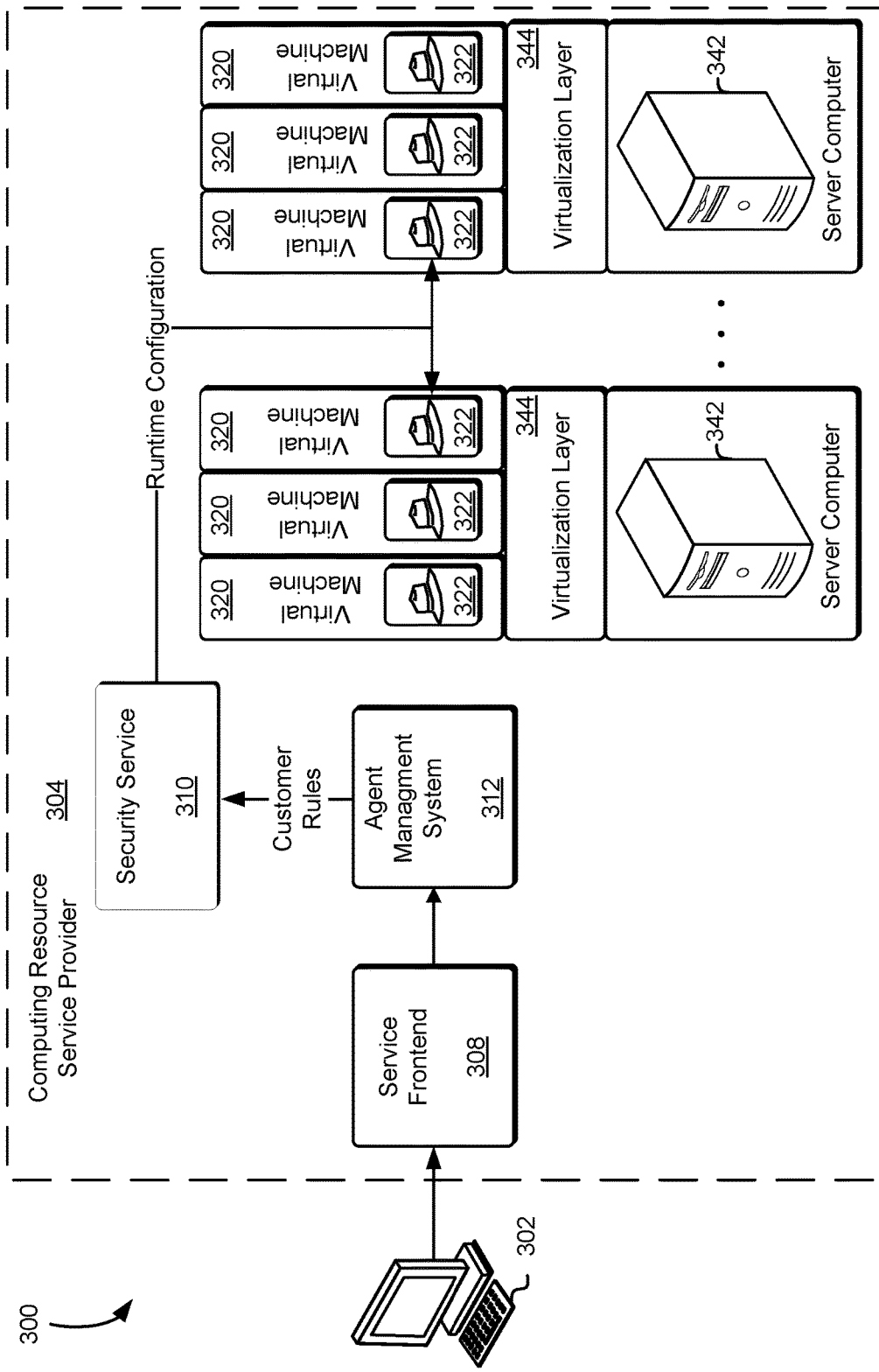
FIG. 3 illustrates an environment in which an agent monitors runtime processes and/or operations of customer-operated computing resources based at least in part on a customer created rule set in accordance with at least one embodiment.

FIG. 3 illustrates an environment 300 in which a security service 310 of a computing resource service provider 304 receives customer rules and generates a set of security rules for processing by an agent 322 in accordance with at least one embodiment. The security service 310, which may be implemented by physical hardware, is used by the computing resource service provider 304 to perform analysis of security threats, security events, and vulnerabilities on behalf of customers 302 and provide the customers 302 with a mechanism for defining customer specific security rules. The security service 310 may include a group of computing systems, such as the server computers 342 described in detail below, which generates runtime configuration based at least in part on a set of security rules used to monitor operational information obtained from a virtual machine 320 by the agent 322 executing within the virtual machine 320 environment. A security event may include a collection of operational information indicating particular security vulnerabilities and/or security threats.

The physical hardware may include a server computer 342. The server computer 342 may be any device or equipment configured to execute instructions for performing data computation, manipulation, or storage tasks, such as a computer or a server. A server computer 342 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as block-level storage devices, storage disks and tapes, networking equipment, and the like.

A virtualization layer 344 may include a bare metal hypervisor or a hosted hypervisor. The virtualization layer 344 executing on the server computer 342 enables the physical hardware to be used to provide computational resources upon which one or more virtual machines 320 or other computing resources may operate. For example, the virtualization layer 344 enables a particular virtual machine to access physical hardware on the server computer 342 through virtual device drivers or other executable code within the memory of the virtual machine 320. The virtualization layer 344 may include a hypervisor or virtualization software and/or hardware. The virtualization layer 344 may also include an instance of an operating system dedicated to administering the virtual machine 320 or other computing resource executing on the server computer 342. Each virtualization layer 344 may include its own networking software stack, responsible for communication with other virtualization layers 344 and, at least in some embodiments, also responsible for implementing network connectivity between the virtual machine 320 or other computing resources executing on the server computer 342 and virtual machine 320 or computing resources executing on other server computers 342. Furthermore, in some embodiments, the agent 322 is executed within the virtualization layer 344.

Furthermore, the server computer 342 may host multiple virtualization layers 344 of the same or different types on the same server computer 342 as well as virtual machine 320 of the same or different types. For example, a server computer 342 may host a first virtual machine instantiated from a first disk image and operated by a first customer and may host a second virtual machine instantiated from a second disk image that is operated by a second customer. The virtualization layer 344 may be any device, software, or firmware used for providing a virtual computing platform and/or virtualized computing resources for the virtual machine 320 and/or component thereof. The virtual computing platform may include various virtual computer components, such as one or more virtual CPUs, virtual memory, virtual disk storage, and the like. The virtual machine 320 may be provided to the customers or other service of the computing resource service provider 304 and the customers may utilize the virtual machine 320 or components thereof. Further, the computing resource service provider 304 may use one or more of its own virtual machines 320 for supporting execution of its applications and providing computing resources for such applications.

A service frontend 308 provides the customer 302 with an interface, such as the user interface described above in connection with FIG. 2, to manage and interact with the security service 310, the agents 322, and/or the virtual machines 320. In some embodiments, the service frontend 308 includes a database or other data store to store information obtained from the customer 302 such as security rule and/or security settings. The agents 322 may include executable code or computing devices described herein capable of obtaining operational information from the virtual machines 320 including information identifying a process or application of the virtual machine 320. The agent management system 312, which may be implemented using server computer systems 342 as described herein, may be responsible for management of the agents 322. For example, in one embodiment, an agent management system 312 receives a request from the customer 302 to install the agent 322 within a particular virtual machine so that the agent 322 may monitor the particular virtual machines according to a specific runtime configuration generated based at least in part on a set of security rules defined by the customer 302. As described above, the runtime configuration includes any configuration information provided to the agent 322 that controls the operation of the agent 322. In addition, the agent management system 312 may be responsible for transmitting customer requests to the security service 310. For example, the agent management system 312 may transmit customer defined security rules to the security service 310 for validation and/or other processing (e.g., generating runtime configuration information).

The security service 310 may be responsible for processing information obtained from the customer 302 to generate the runtime configuration. As described above, the customer may provide the set of security rules in a formal programming language such as OVAL. In other embodiments, the security service 310 provides a mechanism (e.g., a user interface) that enables to customer 302 to provide information which the security service 310 uses to generate the set of security rules. The security service 310 may generate the runtime configuration such that the runtime configuration causes the agents 322 to monitor and control the operation of the virtual machines 320 based at least in part on the set of security rules. The security service 310 may determine the runtime configuration based at least in part on decisions provided by the customer 302 (e.g., through the user interface described above). In addition, the security service 310 may determine the runtime configuration based at least in part on other security information such as a trust score, information obtained from intrusion detection systems, information obtained from a third party (e.g., CIS), or any other information suitable for generating the runtime configuration for one or more agents 322.

The agents 322 monitor the operation of the virtual machines 320 and evaluate the monitored operations based at least in part on the runtime configuration. The runtime configuration may indicate data to be monitored by the agents 322 as well as security threats or other operations that may expose a vulnerability of the virtual machine 320. For example, the runtime configuration indicates that the agents 322 enforcing the runtime configuration are to monitor network connection information, process information, memory information, and CPU utilization information. In addition, the runtime configuration may indicate specific vulnerabilities and associated action for each specific vulnerability. For example, a specific security rule/security setting of the runtime configuration indicates that a particular patch version of an application, if executed by the virtual machine 320, is a security vulnerability and/or security event and further defines a specific action to be taken in response to detecting the particular patch version. In another example, the runtime configuration blocks network traffic from 3,000 distinct IP addresses, the agent 322 may monitor the operation of the virtual machine 320 and block the network traffic from the 3,000 distinct IP addresses.

Figure 4:
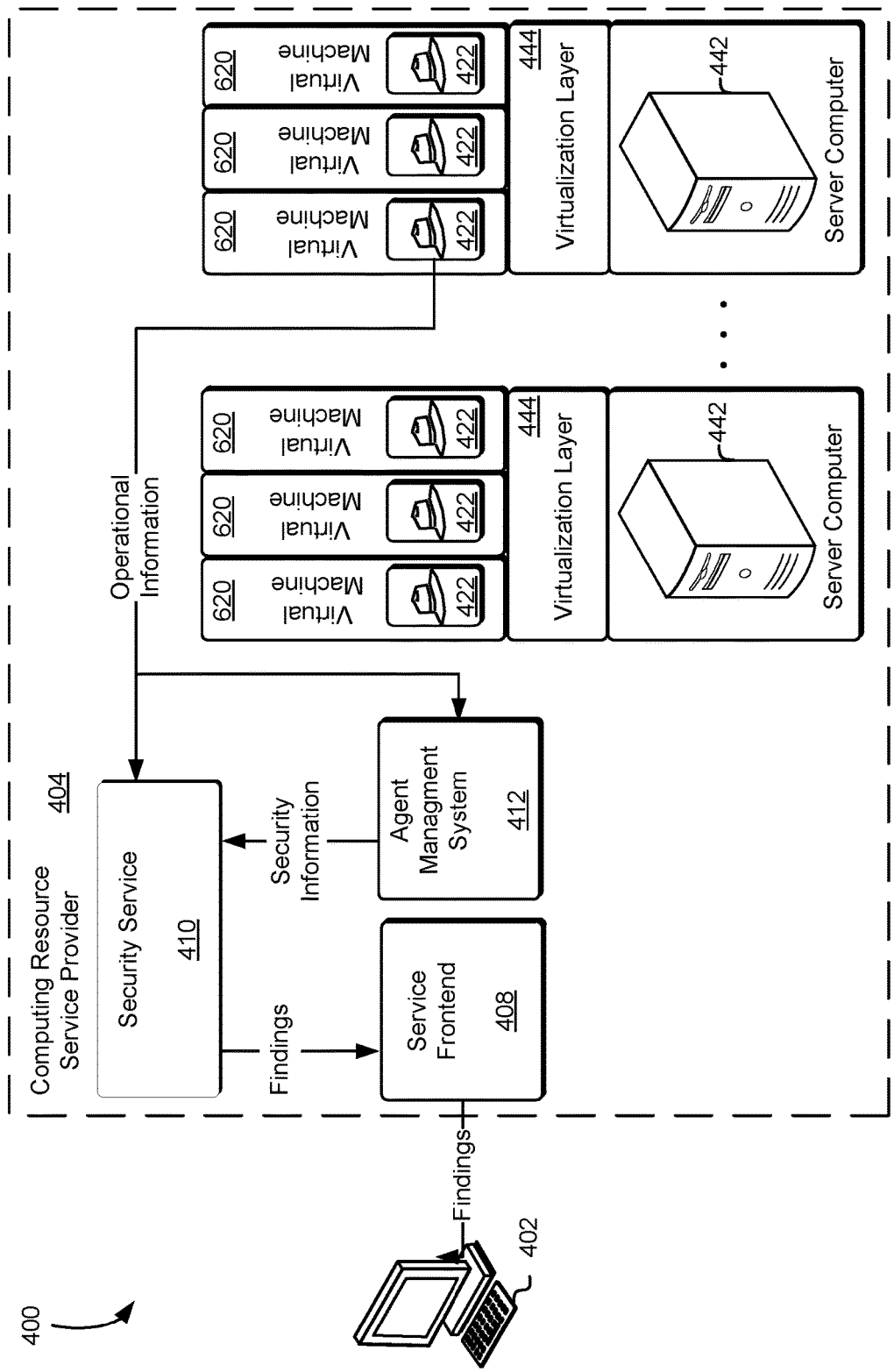
FIG. 4 illustrates an environment in which a security service provides customers with security information generated based at least in part on operational information obtained from an agent in accordance with at least one embodiment.

FIG. 4 illustrates an environment 400 in which a security service 410 of a computing resource service provider 404 may obtain operational information from an agent 422 and generate one or more findings to include in security information provided to a customer 402 in accordance with at least one embodiment. The security service 410, which may be implemented by physical hardware, is used by the computing resource service provider 404 to provide security information for customers 402 and/or other services of the computing resource service provider 404. The security service 410 may include a group of computing systems, such as the server computers 442 described in detail below, that generate security information based at least in part on obtained operational information from agents 422 executed by virtual machines 420. The operational information includes any information obtained by the agent 422 indicated operations or other information associated with the virtual machines 420 as described above. For example, the operational information may include information associated with the processes and/or applications executed by the virtual machine such as software libraries, patch levels, version information, protocols, or any other information associated with the operation of the virtual machine 420. The operational information, in some embodiments, is provided directly to the security service 410. In these embodiments, the security service 410 may provide a subset or portion of the operational information to the agent management service 412 for processing.

The physical hardware may include a server computer 442 as described above in FIG. 3. In addition, a virtualization layer 444 may include a process or application executed by the server computer 442 that provides the virtual machines 420 with access to the physical resources of the service computer 442 as described above in connection with FIG. 3. Commands and other information may be included in an application program interface (API) call from the security service 410 or an agent management system 412, described in greater detail below, to the virtualization layer 444. The security service 410 enables the customers and other services of the computing resource service provider 404 to manage and operate security rules implemented as runtime configurations by the agents 422 as well as generate security threat information based at least in part on operational information obtained from the agents 422. For example, the customer 402 may transmit a request to a service frontend 408 to obtain one or more findings corresponding to security vulnerabilities of a particular virtual machine. In one embodiment, in response to the request, the security service 410 causes the agent 422 executed by the particular virtual machine to perform an assessment over an interval of time (e.g., four hours). During this interval of time the agent collects operational information and evaluates the collected operational information according to a set of security rules and/or runtime configuration defined, at least in part, by the customer as described above. The request may be an API call including information corresponding to the customer 402, the security service 410, a particular agent, or particular virtual machine. In yet other embodiments, the agents 422 are continuously monitoring operational information of the virtual machines 420 and evaluating the operational information based at least in part on the set of security rules. In such embodiments, the customer's API request to the service frontend 408 only returns the most recent findings or other security information. For example, all findings generated since the last customer 402 API request.

The security service 410 may be responsible for processing operational information obtained from the agents 422. The security service 410, for example, evaluates the operational information based at least in part on the set of security rules defined by the customer. The processing by the security service 410 may be in addition to or as an alternative to any processing of the operational information performed by the agent 422. For example, the agent 422 processes the operational information based at least in part on customer defined security rules and the security service 410 processes the operational information based at least in part on a curate set of security rules maintained by the computing resource service provider. In yet other embodiments, the agent 422 processes the operational information based at least in part on a subset of security rules of the set of security rules defined by the customer 402. For example, the customer defines a subset of security rules as system critical, the agent 422 then monitors the operational information based at least in part on the subset of security rules and/or runtime configuration defined as system critical and the security service processes the operational information based at least in part on the remainder of the set of security rules. In additional, the operation information may include operations performed by the agents 422 or security information generated by the agent 422.

Figure 5:
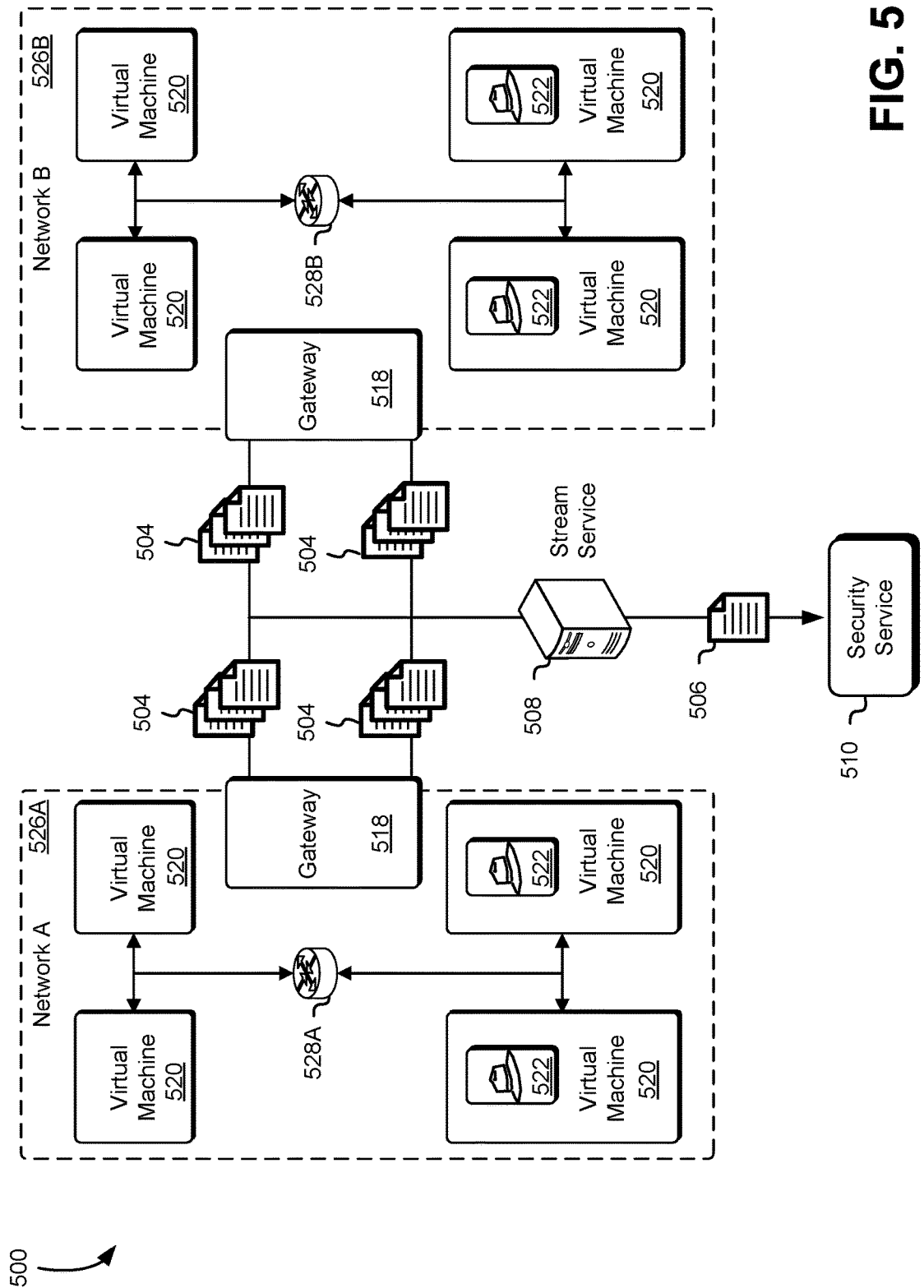
FIG. 5 illustrates an environment in which a log system may collect and distribute operational information from different sources to a security service in accordance with at least one embodiment.

FIG. 5 illustrates an aspect of an environment 500 in which an embodiment may be practiced. Specifically, FIG. 5 depicts the collection and processing of operational information 504 generated by virtual machines 520 and obtained by agents 522. The environment 500 may include a stream service 508 that receives operational information 504 from computing resources executed by servers in the sets of racks. For example, a virtualization layer executing on the server computer in the sets of racks enables the physical hardware of the services to be used to provide computational resources upon which one or more virtual machines 520 or other computing resources may operate. The virtualization layer enables the virtual machines 520 to access physical hardware on the server computer through virtual device drivers or other executable code on the virtual machine 520. The virtual machines 520 may include any number computer systems and applications executed by customers of the computing resource service provider. For example, the virtual machine 520 includes an operating system, an agent 522, and other applications operated by the customer.

The computing resources (e.g., virtual machines 520) may be placed on the servers according to a rack diversity constraint, where the sets of racks may be localized by different networks 526A-526B. The operational information 504 may include information as described above; the information may be obtained from different agents executed by the servers in the sets of racks. The stream service 508 may be a computing system of one or more computing systems that obtains operational information from a plurality of agents 522. Furthermore, the stream service 508 may include computer systems the process the operational information 504 and generate critical operational information 506 which may be consumed by a security service 510, for example, as a stream of data. Critical operational information 506 may include any operational information the customer defines as such. In an embodiment, the stream service 508 obtains operational information and streams the operational information to one or more endpoints. In yet other embodiments, the customer or other entity defines critical information and provides the stream service 508 with this information which causes the stream service 508 to process the operational information and perform various operations. For example, a customer defines a particular network operation as critical, this definition is provided to the stream service 508 and, if the stream service detects an indication of the particular network operation, the stream service 508 generates critical operational information 506 and transmits the critical operational information 506 to the security service. In other embodiments, the stream service 508 transmits the critical operational information 506 directs to an end point operated by the customer and/or indicated by the customer. Furthermore, the stream service 508 may provide multiplexing for multiple security services and/or customers. In various embodiments, the critical operational information 506 may include information associated with remedial operations performed by the agents 522 in response to critical security threats.

The sets of racks may be physical hardware (e.g., server computers as described above) hosting one or more servers, or, in some embodiments, may simply be logical groupings of the one or more servers. Examples of logical groupings other than by rack may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on. The servers in a rack may be members of a particular network. In some implementations, multiple racks of servers may be members of the same network. Additionally, the set of racks may be a "brick server" or other server that is a compact computer server module without a chassis that may include various processors, RAM, I/O, and storage configurations and may be designed to fit into various rack locations. The set of racks may also be connected by a top of rack switch.

The networks 526A-526B may be data communication pathways between one or more electronic devices. The networks 526A-526B may be wired or wireless networks and may use any of a variety of communications protocols for organizing their network traffic. The networks 526A-526B may allow the sharing of files, data, and other types of information between the one or more electronic devices accessible through the data communication pathways. Each of the networks 526A-526B may be associated with a router, such as an aggregation router that aggregates the servers of the respective set of racks into the common network, separate from the router associated with the other network. Each of the networks 526A-526B may be on a different subnet than the other network. For example, as illustrated in FIG. 5, the servers of the set of racks may be commonly connected to a router 528A. Similarly, the servers of the set of racks may be commonly connected to a router 528B. The routers 528A-528B may be networking devices that forward packets between computer networks, such as between the networks 526A-526B.

The environment 500 may also include a gateway 518 that receives network traffic directed to computing systems and/or computing resources, such as virtual machines 520, executed by servers in the sets of racks and enables interfacing with another network, such as the Internet, that may use different protocols. The gateway 518 may contain computing devices such as protocol translators, impedance matching devices, rate converters, fault isolators, or signal translators as necessary to provide system interoperability, such as preforming protocol conversion to enable computing devices to communicate between networks.

The agent 522, as illustrated in FIG. 5, may include executable code that provides additional information to the security service 510. The agent 522 may be a process or application executed by the virtual machine 520. The additional information may include a variety of different information suitable for generating security information including findings as described above. The agent 522 may execute one or more "hooks" in a kernel of an operating system of the virtual machines 520. For example the agent 522 may execute a hook that intercepts messages generated by the operating system when processes are created or terminated by the operating system or other software executed by the virtual machine 520. The executable code that handles such intercepted function calls, events, or messages may be referred to in the context of the present disclosure as a "hook." Executing a hook by the agent 522 or other entity as described herein covers a range of techniques which may be used to alter or augment the behavior of an operating system, applications, or of other executable code by at least intercepting function calls, messages, or events passed between applications, including the operating system. The agent 522 may then generate a stream of additional information corresponding to various hooks executed by the agent 522 and provide the stream to the security service 510. For example, the agent 522 may provide the security service 510 with a complete file path to a binary associated with a process that has been executed or terminated within the virtual machines 520.

As illustrated in FIG. 5, the agent 522 may be executed by a portion of the virtual machines 520. For example, only a portion of the customers of the computing resource service provider may wish to have the agent 522 installed and executed by virtual machines 520 operated by the customer. The agent 522 may also obtain additional information associated with the configuration of the customer's virtual machine. For example, the agent may determine that a firewall integrated with an operating system executed by the virtual machine 520 is disabled. The security service 510 may also communicate with the agent 522 and/or transmit commands to the agent 522. For example, the security service 510 can transmit a command to the agent 522 to modify a configuration of the customer's virtual machine. Returning to the example above, the security service 510 determines, based at least in part on security information, that disabling the integrated firewall of the operating system exposes a security risk based at least in part on the set of security rules defined by the customer and transmits a command to the agent 522 to enable the integrated firewall and/or to modify one or more settings of the firewall to mitigate potential security threats. In some embodiments, these operations are performed by the agent 522 as indicated in the set of security rules defined by the customer and provided to the agent 522.

The security service 510 may process information obtained from the agents 522 and/or operational information 504 based at least in part on the set of security rules defined by the customer or other set of security rules as described above. For example, the security service 510 may identify malicious activity indicated in operational information 504 at various levels from various sources. For instance, operational information 504 indicating network activity from a firewall operated by the computing resource service provider may indicate a set of IP addresses establishing network connections with virtual machines 520. The agent 522 may provide additional information indicating file paths and binaries executed by the virtual machine 520 around the time the network connections where established. In addition, an intrusion detection system may provide hashes of known malware which may be compared to the binaries executed by the virtual machines 520. Other sources of operational information 504 may include computing resource utilization, for example, processor load or load on various computing devices.

This information may be correlated by the security service 510 to determine a subset of the IP address associated with malicious activity (e.g., the binaries executed by the virtual machines 520 match known malware). This correlated security model may then be used to update firewall setting to block the subset of IP addresses associated with malicious activity. In another example, the security service 510 observes the same IP address attempting to connect to 100 different customer virtual machines. The security service 510 can then transmit an alarm to the 100 different customers and update the correlated security model to indicate the IP address is associated with malicious activity.

Figure 6:
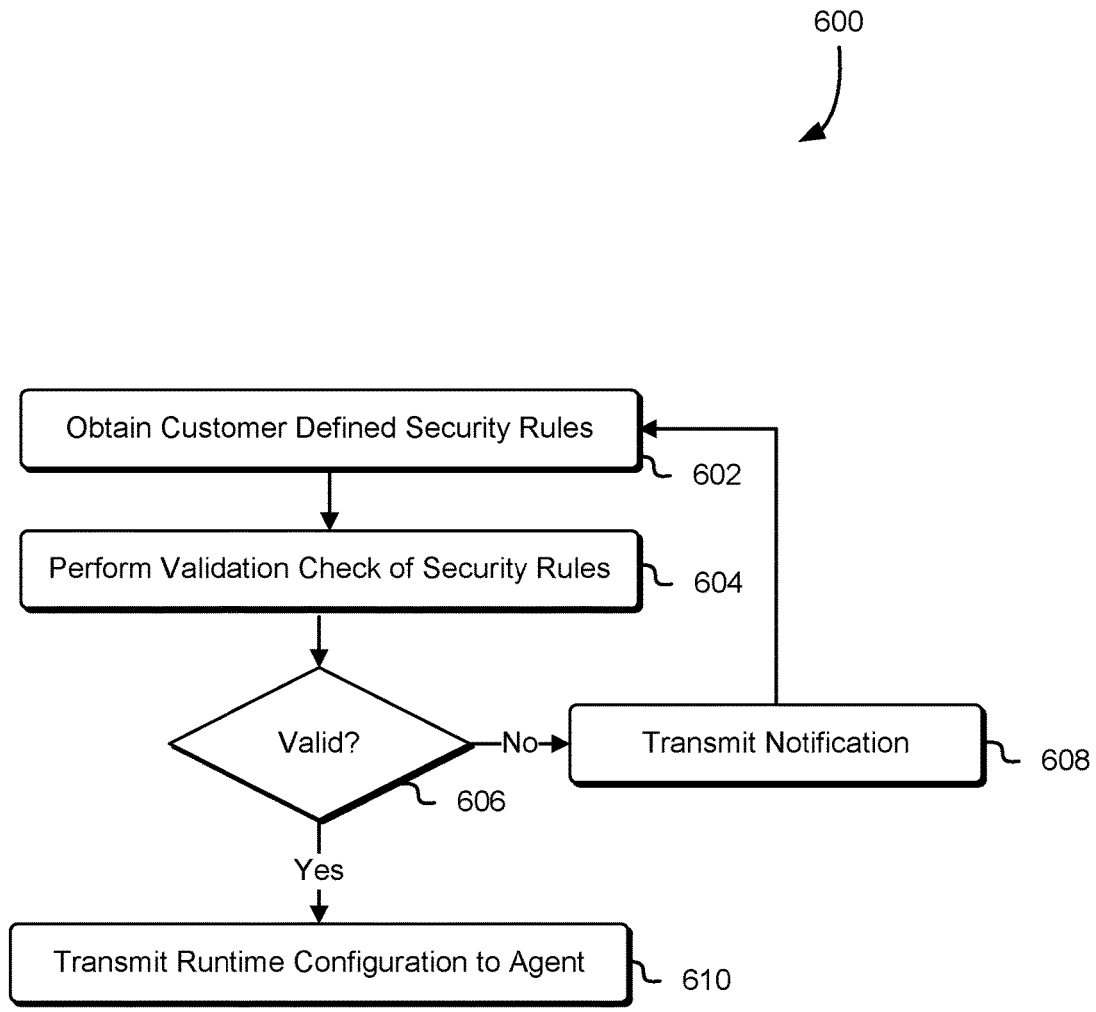
FIG. 6 shows an illustrative process which may be used to validate customer created rule sets for use by agents monitoring customer-operated computing resources in accordance with at least one embodiment.

FIG. 6 is a block diagram illustrating an example of a process 600 for providing customers with a mechanism for defined security rules and validating customer defined security rules in accordance with at least one embodiment. Some or all of the process 600 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 600 may be performed by any suitable system, such as a server in a data center, by various components of the environment 300 described in conjunction with FIG. 3, such as the security service 310, by multiple computing devices in a distributed system of a computing resource service provider, or by a service provided by a computing resource service provider. The process 600 includes a series of operations where security rules are validated and provided to the agents for processing. For example, the process 600 includes obtaining customer defined security rules 602. As described above, the security service may provide a user interface to enable customers to define security rules. The security rules may be defined according to a formal structure language such as OVAL.

Once the customer defined security rules are obtained by the security service, the security service may then perform a validation check of the security rules 604. In one example, the validation check performed by the security service validates syntax of the security rules. In another example, the security service performs validation of the security rules to ensure that the security rules do not cause a failure of the agents as a result of processing or enforcing the security rules. The security service may, based at least in part on a result of performing the validation check, determine if the security rules are valid 606. If a particular security rule is invalid, the security service may then transmit a notification 608. The notification may be provided to the customer and may indicate which customer defined security rule is invalid and a reason for the security rule invalidation.

However, if the security rules are valid, the security service may generate runtime configuration based at least in part on the security rules and generate the runtime configuration to the agent 610. The security rules may be transmitted over a network as described above and may cause the agent to monitor the operation of a virtual machine to detect security threats or other vulnerabilities. Note that one or more of the operations performed in 602-610 may be performed in various orders and combinations, including in parallel. For example, the system executing the process 600 may provide the security rules to the agent in parallel with validating the security rules. In numerous variations to the process 600, one or more of the operations 602-610 may be omitted or performed by other systems of services. For example, the validation of the security rules may be omitted from the process 600.

Figure 7:
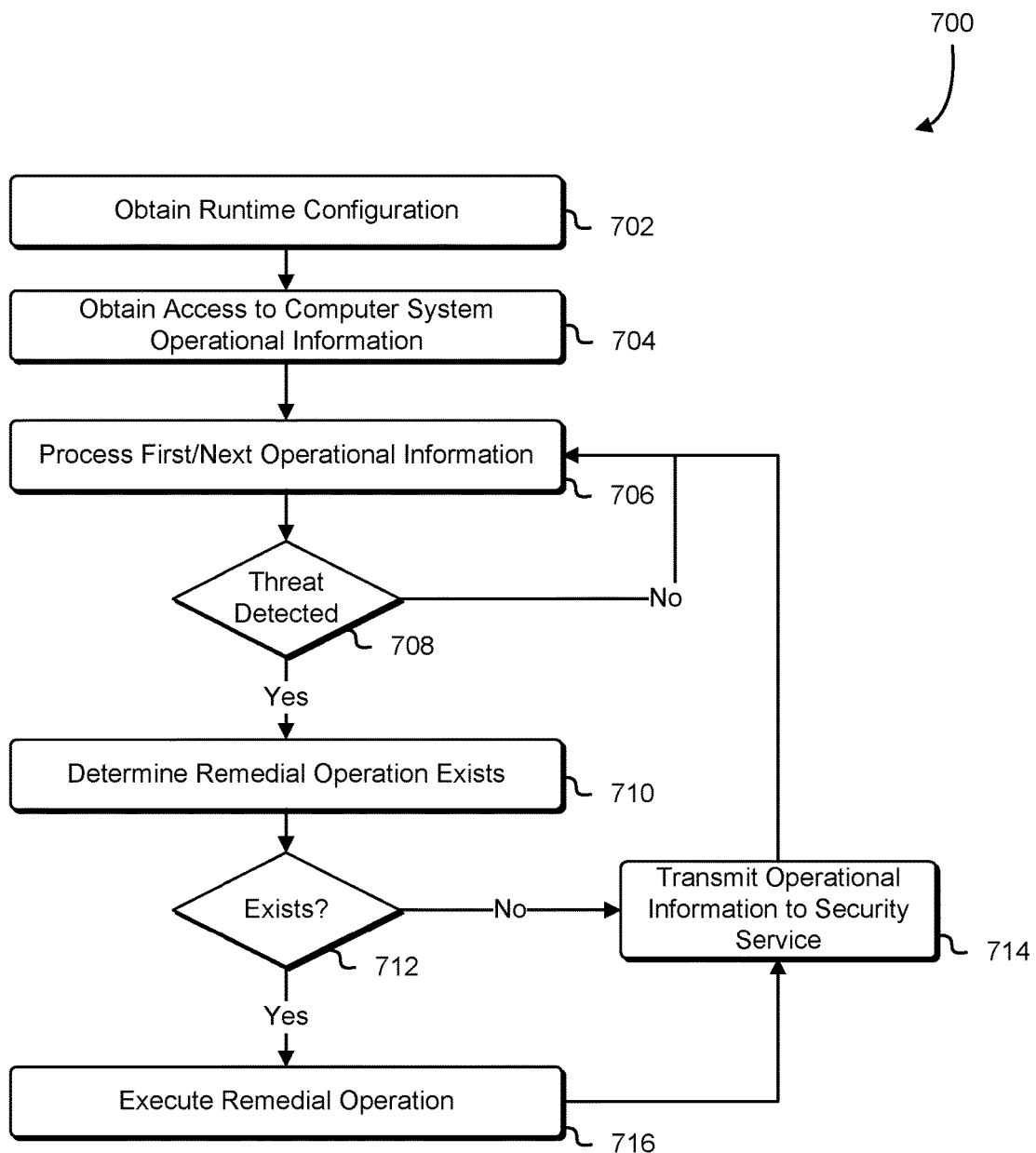
FIG. 7 shows an illustrative process which may be used to perform runtime security threat monitoring and remediation in accordance with at least one embodiment.

FIG. 7 is a block diagram illustrating an example of a process 700 for monitoring and mitigating, by an agent, security threats and vulnerabilities of a computer systems based at least in part on customer defined security rules in accordance with at least one embodiment. Some or all of the process 700 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by any suitable system, such as a server in a data center, by various components of the environment 400 described in conjunction with FIG. 4, such as the agent 422, by multiple computing devices in a distributed system of a computing resource service provider, or by a service provided by a computing resource service provider. The process 700 includes a series of operations where security rules are provided to the agent to enable the agent to monitor and remediate security threats to the computer system. For example, the process 700 includes obtaining runtime configuration 702. The runtime configuration may be obtained from a security service as described above. Furthermore, the runtime configuration may be generated based at least in part on customer defined security rules as described above. In some embodiments, the customer defined security rules may be generated at least in part on one or more curated security rule sets such as CIS security rules.

The agent executing the process 700 may then obtain access to computer system events 704. For example, the agent is executed at the "root" or kernel level of the computer system's operation system and as such has access to all of the operational information of the computer systems. In other examples, the agent is granted access to specific operational information, such as process information and networking information. Once the agent has access to the computer system operation information, the agent may begin to monitor the computer system by at least processing the first/next operation information 706. The agent then processes the operation information based at least in part on the security rules. Evaluation of the security rules indicates whether a threat is detected 708.

For example, the operational information may include network connections, networking protocols, port numbers, and external IP addresses. This information is then evaluated based at least in part on the customer defined rule set, if the information violates one or more of the security rules then a threat is detected 708. A violation may occur if any of the operational information is indicated as a violation in the security rules. For example, a particular security rule may indicate that the patch level for any operating system component cannot be greater than two previous versions of the patch level or a violation has occurred. Therefore, if the agent detects an operating system component with a patch level of two or more previous versions the agents determines that a threat is detected. Returning to FIG. 7, if no threat is detected the agent continues to monitor the computer systems and returns to process the next operational information 706.

However, if a threat is detected, the agent will then determine whether a remedial operation exists 710. As described above, the customer may define various threats and/or threat levels associated with the violation of one or more rules or other information defined in the runtime configuration. Furthermore, the runtime configuration may indicate a particular remedial operation to perform in response to the determined threat or particular information included in the operation information. If the agent determines that no remedial operation is indicated in the runtime configuration 712, then the agent may simply transmit the operational information to the security service 714. As described above, the operational information may include additional information obtained and/or generated by the agent. However, if the security threat, as indicated by the runtime configuration information, is associated with a remedial operation 712, the agent may then execute remedial operations 716. Returning to the example above, once the agent determines that the operating system's component has a patch level greater than the two previous versions, the agent, based at least in part on the runtime configuration, may update the patch level to the most current version. Other remedial operations as described above may also be performed.

Once the remedial operations are performed, the agent may transmit the operational information, including the remedial operations performed, to the security service. Note that one or more of the operations performed in 702-716 may be performed in various orders and combinations, including in parallel. For example, the system executing the process 700 may execute the remedial operations in parallel with transmitting the operational information to the security service rules. In numerous variations to the process 700, one or more of the operations 702-716 may be omitted or performed by other systems or services. For example, the agent may not execute remedial operations 716 and may simply transmit operational information to the security service 714.

Figure 8:
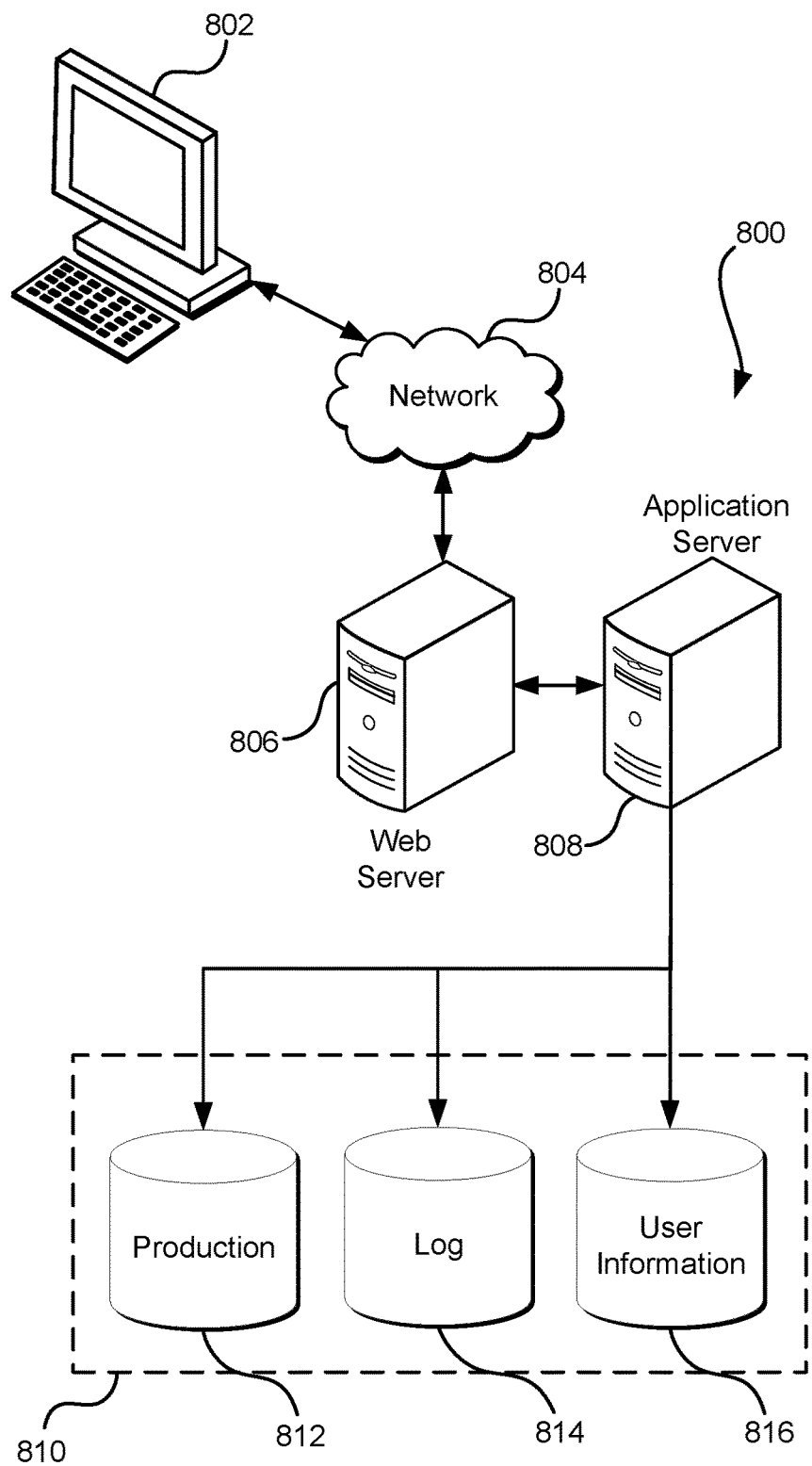
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a runtime configuration generated based at least in part on a set of security rules defining a set of security threats to a computer system instance and a set of remedial operations, the set of security rules generated based at least in part on customer input provided through a web service front-end, the computer system instance and the web service front-end provided by a computing resource service provider, the computer system instance a member of a set of computer system instance provided to customers of the computing resource service provider, where the runtime configuration indicates a threat level associated with a security threat included in the set of security threats;
   obtaining access to operational information of the computer system instance, the operational information indicating at least a configuration of the computer system instance, a set of processes executed by the computer systems instance, and a set of operations performed by the computer systems instance;

determining a security threat of the set of security threats to the computer system instance by at least processing the operational information based at least in part on the runtime configuration;

performing a remedial operation of the set of operations indicated by the runtime configuration; and providing the operational information and information associated with the remedial operation.

2. The computer-implemented method of claim 1, wherein performing the remedial operation further comprises performing the remedial operation as a result of receiving a command from a security service provided by the computing resource service provider.

3. The computer-implemented method of claim 2, wherein the remedial operation is indicated by a customer of the security service.

4. The computer-implemented method of claim 1, wherein obtaining the set of security rules further comprises obtaining the set of security rules through a user interface exposed to a customer as a management console.

5. A system, comprising:
one or more processors; and
memory to store computer-executable instructions that, if executed, cause the one or more processors to:
obtain a runtime configuration from a security service provided by a computing resource service provide, the runtime configuration generated based at least in part on a set of security rules, at least a portion of the set of security rules including a customer input and the runtime configuration including an indication of a threat level associated with a security threat detectable based at least in part on a violation of a subset of security rules of the set of security rules;
provide the runtime configuration to an agent, the agent executed by a virtual machine instance supported by the system and managed by the computing resource service provider;
detect the security threat by at least processing operational information based at least in part on the runtime configuration;
perform a remedial operation in response to the security threat, the remedial operation indicated in the runtime configuration; and
transmit information associated with the remedial operation and operational information to the security service.

6. The system of claim 5, wherein the set of security rules are defined by a customer using a programming language.

7. The system of claim 6, wherein at least a portion of the set of security rules are generated based at least in part on security rules published by a third party.

8. The system of claim 5, wherein the runtime configuration further comprises a set of validated security rules generated by the security service based at least in part on the set of security rules.

9. The system of claim 5, wherein memory further includes computer-executable instructions that, if executed, cause the one or more processors to provide the agent with operating system privileges to perform one or more operations.

10. The system of claim 5, wherein the operational information further comprises information associated with a set of processes executed by the virtual machine instance.

11. The system of claim 5, wherein the operational information further comprises information associated with a set of static configurations of the virtual machine instance.

12. A set of non-transitory computer-readable storage media having that stores executable instructions that, if executed by one or more processors of a computer system, cause the computer system to:
obtain a runtime configuration generated based at least in part on a set of security rules generated based at least in part on customer defined security rules obtained through a service front-end of a security service provided by a computing resource service provider, the runtime configuration including a threat level of a security threat associated with the set of security rules;
provide the runtime configuration to an agent executed by a virtual computer system instance provided by the computing resource service provider;
detect, by the agent executed by the virtual computer system instance, the security threat to the virtual computer system instance by at least:
obtaining operational information associated with the virtual computer system instance; and
evaluating the operational information based at least in part on the runtime configuration; and
provide information associated with the security threat.

13. The set of non-transitory computer-readable storage media of claim 12, wherein the instructions that cause the computer system to provide information associated with the security threat further include instructions that cause the computer system to provide information associated with the security threat to a stream service responsible for multiplexing information associated with security threats to a plurality of security services provided by a computing resource service provider.

14. The set of non-transitory computer-readable storage media of claim 13, wherein the instructions that cause the computer system to provide information associated with the security threat further include instructions that cause the computer system to provide a notification of the security threat to a customer associated with the virtual computer system instance.

15. The set of non-transitory computer-readable storage media of claim 12, wherein the instructions further comprise instructions that, as a result of being executed by the one or more processors, cause the computer system to perform, by the agent, a remedial operation associated with the security threat to virtual computer system instance based at least in part on the runtime configuration.

16. The set of non-transitory computer-readable storage media of claim 15, wherein the instructions further comprise instructions that, as a result of being executed by the one or more processors, cause the computer system to:
provide the agent with access to a set of privileges to perform the remedial operation; and
remove access to the set of privileges as a result of the agent completing performance of the remedial operation.

17. The set of non-transitory computer-readable storage media of claim 15, wherein the instructions that cause the computer system to perform, by the agent, the remedial operation further include instructions that cause the computer system to terminate a process of the virtual computer system instance.

18. The set of non-transitory computer-readable storage media of claim 15, wherein the instructions that cause the computer system to perform, by the agent, the remedial operation further include instructions that cause the computer system to terminate a network connection between the virtual computer system instance and at least one other computer system.

19. The set of non-transitory computer-readable storage media of claim 15, wherein the instructions that cause the computer system to perform, by the agent, the remedial operation further include instructions that cause the computer system to perform the remedial operation in response to a security event generated based at least in part on the information associated with the security threat.

20. The system of claim 5, wherein the computer-executable instructions that cause the one or more processors to perform the remedial operation in response to the security threat further include computer-executable instructions that, if executed, cause the one or more processors to perform the remedial operation based at least in part on the threat level associated with a security threat.

\* \* \* \* \*